E. A. Keasey,
King Bolt,
No. 69,446  Patented Oct. 1, 1867.

Witnesses.
Theo Tusche
W. Trevrn

Inventor.
E A Keasey
Per Munn Attys

United States Patent Office.

ENOS A. KEASEY, OF LIGONIER, INDIANA.

Letters Patent No. 69,446, dated October 1, 1867.

---

IMPROVEMENT IN KING-BOLT.

---

*The Schedule referred to in these Letters Patent and making part of the same.*

---

TO ALL WHOM IT MAY CONCERN:

Be it known that I, ENOS A. KEASEY, of Ligonier, in the county of Noble, and State of Indiana, have invented a new and useful Improvement in King-Bolt; and I do hereby declare that the following is a full, clear, and exact description thereof, which will enable others skilled in the art to make and use the same, reference being had to the accompanying drawings, forming part of this specification, in which—

Figure 1:
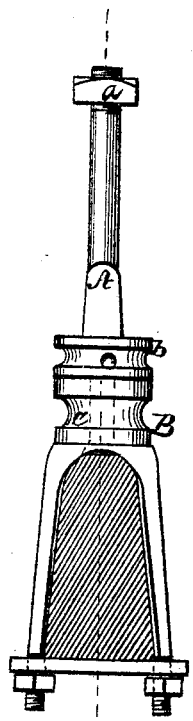

Figure 1 is a side view of my improved swivel king-bolt.

Figure 2:
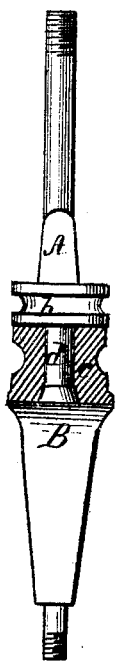

Figure 2, a side view, partly in section.

Similar letters of reference indicate like parts.

This invention relates to an improved construction of king-bolts for carriages and other vehicles, and consists in attaching the bolt with a swivel-joint to the axle-clip which supports the bolt, by a shoulder, so that the bolt and head-block shall turn together.

A is the king-bolt, on the lower part of which is made a circular shoulder-piece, $b$, which sets under the head-block of a carriage to support it, and rests upon the upper side $c$ of the axle-clip B. The bolt is made square for a part of its length above the shoulder-piece $b$, to keep it stationary in the head-block, and is threaded on the upper end to be secured by the nut $a$. Below the shoulder-piece $b$ a round projection or extension, $d$, of the king-bolt passes through a hole in the clip, to which it is riveted in such a manner that it shall form a swivel-joint, to turn freely in the clip.

Having thus described my invention, I claim as new, and desire to secure by Letters Patent—

A king-bolt made with a shoulder-piece, $b$, and a projection, $d$, at the lower end, forming a swivel-joint with the clip B, constructed and operating as herein described.

ENOS A. KEASEY.

Witnesses:
E. W. KRUPPER,
S. C. LITTELL.